United States Patent
Persson

[19]

[11] Patent Number: 5,950,284

[45] Date of Patent: Sep. 14, 1999

[54] STRAPPING APPARATUS

[75] Inventor: Bengt Persson, Enebyberg, Sweden

[73] Assignee: Weta Plast AB, Sweden

[21] Appl. No.: 09/051,460

[22] PCT Filed: Oct. 16, 1996

[86] PCT No.: PCT/SE96/01314

§ 371 Date: Apr. 13, 1998

§ 102(e) Date: Apr. 13, 1998

[87] PCT Pub. No.: WO97/14579

PCT Pub. Date: Apr. 24, 1997

[30] Foreign Application Priority Data

Oct. 19, 1995 [SE] Sweden .................................. 9503667

[51] Int. Cl.[6] .............................. B60P 7/08; F16G 11/00
[52] U.S. Cl. .................. 24/129 R; 24/132 R; 24/115 K; 294/74
[58] Field of Search .................. 294/74, 82.11; 24/129 R, 129 D, 129 B, 129 A, 115 R, 115 K, 136 R, 132 WL, 130, 131, 132 R

[56] References Cited

U.S. PATENT DOCUMENTS

| | | |
|---|---|---|
| 630,837 | 8/1899 | Anderson et al. |
| 917,738 | 4/1909 | Opsal .................................. 24/129 R X |
| 1,009,808 | 11/1911 | Truesdell .............................. 24/129 R |
| 1,452,338 | 4/1923 | Flowers . |
| 1,753,901 | 4/1930 | Nueberger ............................. 24/129 R |
| 2,093,872 | 9/1937 | McCoy ............................... 24/129 R X |
| 2,193,236 | 3/1940 | Meighan .............................. 24/129 R |
| 2,230,676 | 2/1941 | Chevalier ................................. 294/74 |
| 2,240,510 | 5/1941 | Meighan ........................... 24/129 R X |
| 2,478,184 | 8/1949 | Elliott ................................... 24/131 C |
| 2,932,072 | 4/1960 | Pruchnow . |
| 3,204,305 | 9/1965 | Deex .................................. 24/129 R X |
| 4,872,240 | 10/1989 | Spinner et al. ..................... 24/129 R X |

*Primary Examiner*—James R. Brittain
*Assistant Examiner*—Robert J. Sandy
*Attorney, Agent, or Firm*—Larson & Taylor

[57] ABSTRACT

A strapping apparatus for strapping, clamping together or holding together different objects includes a strapping body and a strapping means. The strapping body is a solid body formed with at least one pair of slots or bores extending angularly to each other and extending straight through the strapping body. The strapping means is a rope, a wire or a band having an eye, or locking sling, at one end thereof and a free rope end at the opposite end. The eye of the strapping means extends through a slot of the pair of slots or bores, whereas the free rope end is introduced through the second slot or bore and is drawn underneath the eye as seen in a strapping direction.

8 Claims, 4 Drawing Sheets

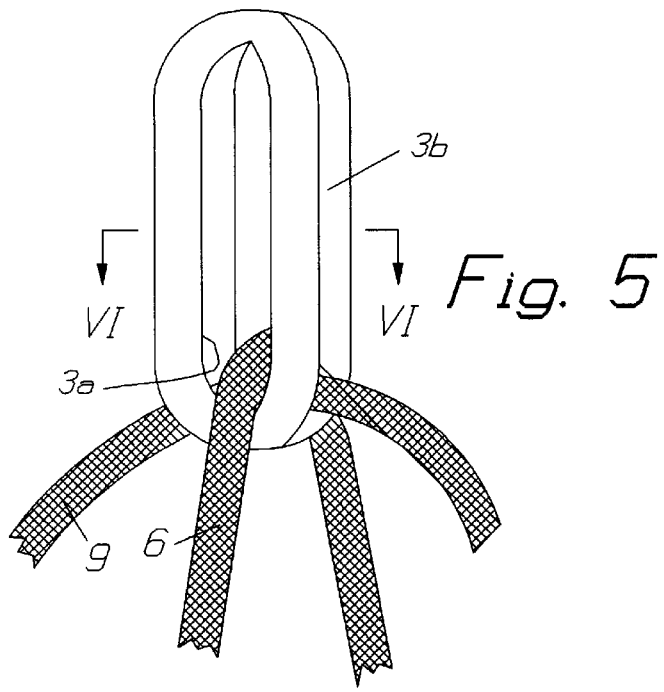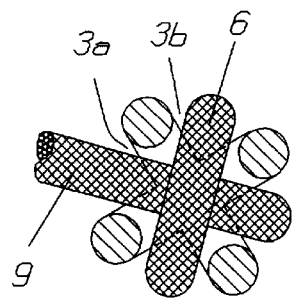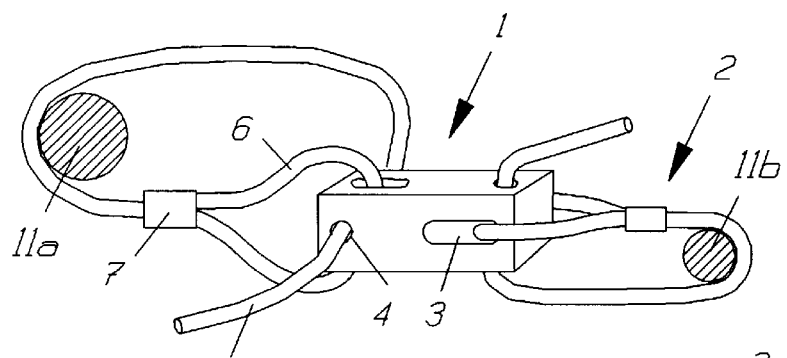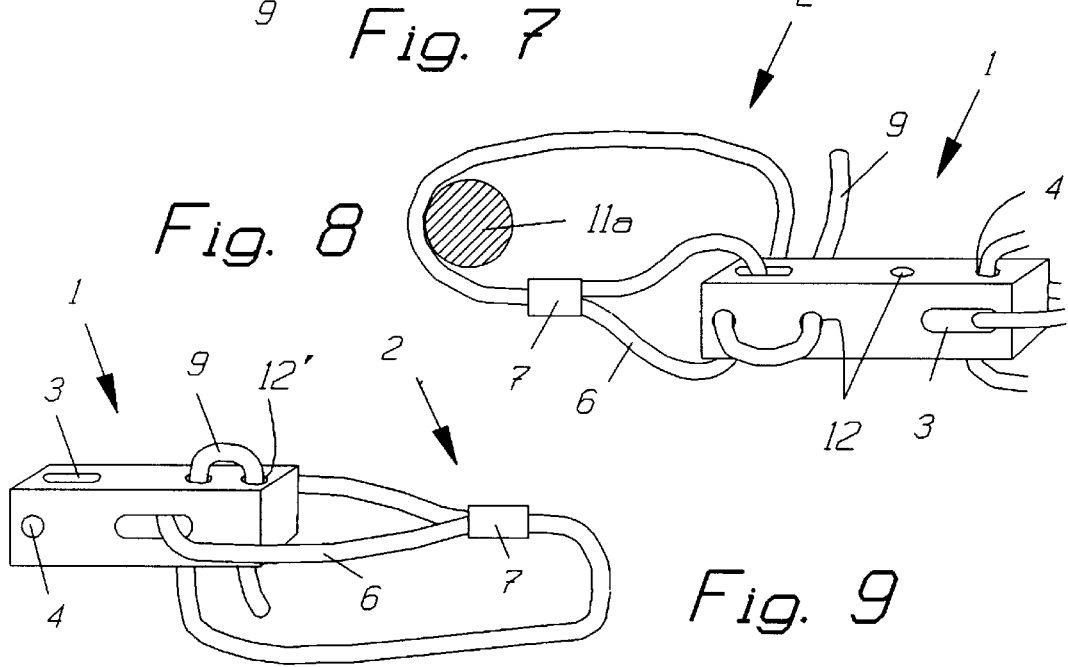

STRAPPING APPARATUS

FIELD OF THE INVENTION

The present invention relates to an apparatus which is intended to be used for strapping, lashing down and tying all kinds of various things together, for instance strapping objects like motorcars to the deck of ships, strapping objects on trucks, tying loads on car roof racks, for making boats fast to jetties, for strapping tents and tarpaulins etc. to the ground, for tying two objects together, for tying packs and for many other purposes.

BACKGROUND OF THE INVENTION

There are since long many various types of strapping apparatus for strapping objects as mentioned above, both as concerns strapping of objects to a stationary connection means and for interconnecting two or more objects, for tying packs and boxes together, etc. Many such strapping apparatus consist of lines or ropes which are tied or knotted together, or they may be strapping bands having some type of winch like strapping apparatus, chains having some type of lever like strapping means, or various types of wire capstans, etc.

Most such known strapping apparatus include one or more of the following lacks or disadvantages:
it takes long time and includes several operations for strapping same;
in some cases there is a need for two men for strapping same;
they are expensive to manufacture;
they necessitate frequent maintenance;
they may become unintentionally unstrapped;
they can be difficult and heavy to release;
they may unintentionally cause an a too strong strapping which makes the releasing thereof difficult, etc.

In many cases, for instance when strapping a large number of goods together, like motor cars, general cargo and other types of goods on ships or on railway wagons, or when strapping of boxes and other goods on trucks, in vans, in containers etc. it is important that the strapping can be made quickly, that it is easy to strap and release the objects, that the strapping apparatus is so flexible that it can be used for a large number of purposes, and that the apparatus, in spite of its flexibility etc. provides a safe strapping of the goods. In many cases it is also important that the strapping apparatus is so cheap to manufacture that it may even be used as a non-return product. This is especially important at long trade transporting of goods, in which case it can be doubtful that the strapping apparatus will be returned to the original loading place.

SUMMARY OF THE INVENTION

Thus, the present invention is intended to solve the above mentioned problems and lacks of previously known strapping apparatus and to provide a very simple, inexpensive and flexible, but still effective, safe and multipurpose strapping apparatus which can be used for many different purposes.

The invention is built on the principle that a strapping means in the form of a rope, a wire, a band, a sling or a similar means is laid in a sling in a strapping body, that the strapping means locks itself when being strapped, and which strapping means can, when desired, easily be released, and this is done simply in that the sling of the strapping means is lifted slightly. The locking is made both by friction against a part of the strapping body, and by friction between two, eventually more slings of the strapping means, and also in many cases by a mechanical locking between rope cores and other parts of the strapping means.

BRIEF DESCRIPTION OF THE DRAWINGS

Further characteristics and advantages of the invention will be evident from the following specification in which reference will be made to the accompanying drawings.

FIG. 5 shows an example of a strapping body made of metal arcs and suited for being used double sided perspective, as seen in a side view;

FIG. 6 is a cross section along line VI—VI of FIG. 5;

FIG. 7 shows a strapping apparatus of the same type as that of FIGS. 1–3 but formed double sided and double acting;

FIGS. 8 and 9 show two alternative embodiments of strapping bodies formed for providing an extra locking safety for the strapping rope;

DETAILED DESCRIPTION OF THE PREFERRED EMBODIMENTS OF THE INVENTION

Figure 1:
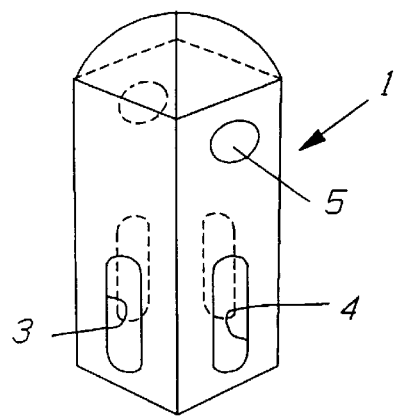
FIG. 1 shows, in a perspective view, an example of a strapping body being a part of the invention.
Figure 2:
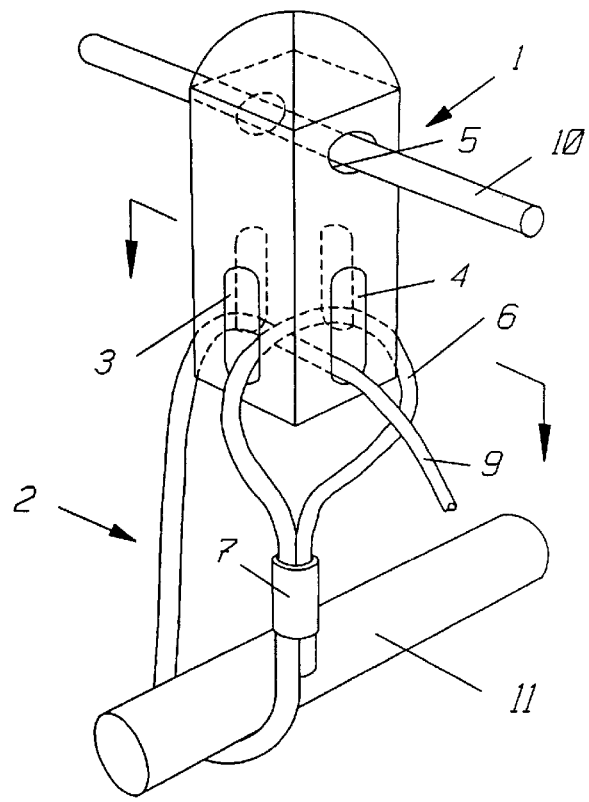
FIG. 2 diagrammatically, and in a perspective view, shows the function of a strapping apparatus comprising the strapping body shown in FIG. 1.
Figure 3:
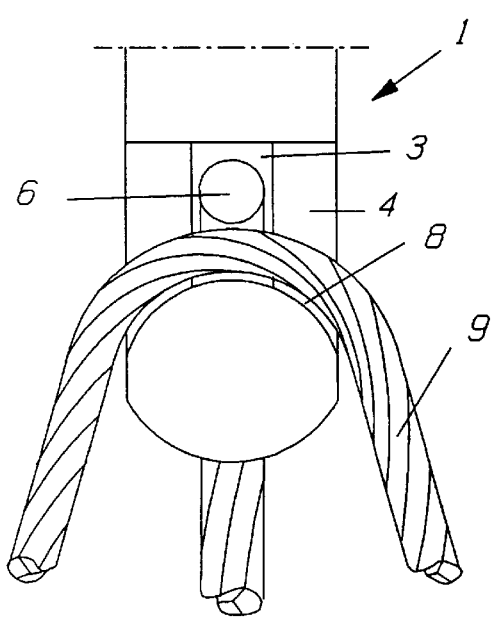
FIG. 3 is a cross sectional view along line III—III of FIG. 2.

The apparatus shown in FIGS. 1–3, which is one out of many possible examples of a strapping apparatus according to the invention, generally comprises a strapping body 1 and a strapping means 2 adapted to extend through two or more sets of slots or bores 3, 4 of the strapping body. The strapping body also may contain some type of bore 5 for making it possible to secure the strapping body against a stationary object.

The strapping body can be made of many various types of material like plastic, wood or metal, and it can be moulded, compression moulded or jet moulded, welded or forged by metal, or it can be made from a solid piece of metal which by a cutting working has been formed with slots and bores.

The strapping means 2 can be a rope, a wire, a band or another elongated and flexible material which has a friction creating surface. It can be a rope or a wire which as conventional is formed by spirally extending cores, but it can alternatively be a spun or woven rope or a round or flat band.

The rope or band 2 is formed with a closed sling or eye 6 extending through a slot 3 extending straight through the strapping body 1 and the slot has a length in the longitudinal direction of the strapping body which is at least twice the diameter or thickness of the strapping rope 2. The rope is locked in eye shape by a splice, by means of a clamp sleeve 7 or a similar means. The eye 6 is great enough for being displaced at least some distance in the longitudinal direction of the slot 3. On level with the bottom 8 of the slot 3 there is a slot or a bore 4 extending at an angle, preferably right angle to the slot 3. The end 9 of the rope 2 extends through said cross bore or slot 4 and should extend underneath the eye 6.

In the strapping apparatus according to FIGS. 1–3 the strapping body is, at a suitable place like at the free end of the strapping body, formed with some type of means for securing the strapping body, for instance to a stationary object. Said means may be a bore 5 by means of which the strapping body 1 can be secured, for instance to a bar 10. Alternatively the strapping body 1 can be secured by means of a rope extending through said bore 5.

For eliminating the risk of sharp bending of the rope 9 extending through the bore or slot 4 the bottom 8 of the slot 4 can be formed arcuate. Also the bottom of the slot 3 for the eye 6 can be arcuate. By this shaping also the contact surface is increased for the rope 9 and thereby the friction between the rope and the strapping body. For further increasing the friction the slot bottom 8 may upon need be formed with a slightly rough surface. A too rough surface, however, may make it difficult to release the joint.

The apparatus operates as diagrammatically shown in FIG. 2, in which the strapping body 1 is secured to a stationary object, as indicated by the bar 10; the rope 2 is drawn round the object, for instance round a shaft 11 or a car to be strapped; the free end 9 of the rope 2 is introduced through the bore or slot 4 and is pulled under the eye or sling 6 extending through the slot 3; when thereafter the free end 9 of the rope is tightened this results in a tightening of the rope between the strapping body 1 and the object 11 to be strapped; as a result thereof the free end 9 of the rope 2 is pressed against the bottom 8 of the slot, and also, the sling 6 is pressed against the upper surface of the rope end 9; thereby a friction force is created between a sling part of the rope 9 and the bottom 8 of the slot 4, and also, there is created a mechanical joint between the cores of the eye 6 and the cores of the rope end 9 extending transversally of said eye 6. The joint is so strong that it can not unintentionally be released, not even if the rope is repeatedly stretched and slackened depending on a certain reciprocal movement of the strapped object 11.

A releasing of the strapping apparatus can be made only in that the free end 9 of the rope is lifted slightly upwards, whereby the eye 6 is also lifted and the friction between the rope end 9 and the bottom 8 of the slot or bore 4 is thereby also reduced at the same time as the strength of the mechanical joint between the cores of the eye 6 and the rope 9 is concurrently therewith reduced so that the rope end 9 can slide back thereby releasing the strapped object 11.

Figure 4:
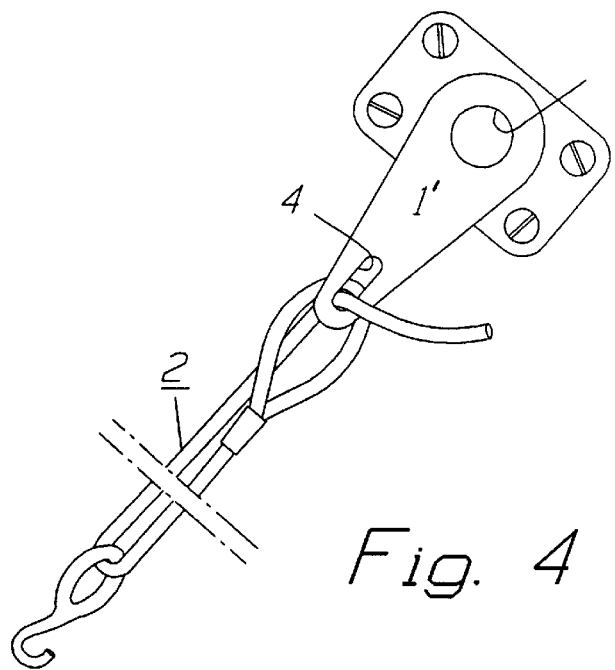
FIG. 4 shows a strapping apparatus according to the invention useful for making boats fast to a jetty or a quay.

In FIG. 4 is shown a strapping apparatus according to the invention which is useful for instance for making fast ships or boats to a jetty or a quay. In the illustrated case the strapping body 1' is formed with a connection bore 5' which is laid over a pole 12 of a boat, and the rope 2 is, between the eye 6 and the free end 9 of the rope, formed with a hook 13 or a similar means by means of which the rope can be connected to the jetty or the quay. The function is the same as described above in connection to FIGS. 1–3.

In FIG. 5 is shown an alternative embodiment of a strapping body which is made of metal and which is mainly formed by four metal arcs, similar to meridians, which are rotated 90° in relation to each other, and which metal arcs are interconnected at their joining ends. Between said arcs there are formed a type of slots 3a, 3b in which eyes 6 and rope ends 9 can be introduced. The illustrated strapping body can be used in the same way as described above in connection to FIG. 2, but is may as well be used "double acting", in that there is provided a combination of eye 6 and rope end 9 at both "poles" of the metal arcs. Such a use makes it possible to strap together two objects which are spaced from each other, whereby said strapping together is accomplished in that one rope end 9, or both rope ends 9 are tightened until both strapping ropes are tightened and secured under their respective eyes 6.

FIG. 7 illustrates a clamp body of the same type as that of FIGS. 1–3, and which is formed double acting and can be mounted between two different objects 11a, 11b which are to be interconnected, for instance interconnecting two boxes or containers.

FIGS. 8 and 9 illustrate a way of increasing the safety of the locking function. In FIG. 8 the strapping body is formed with an additional bore 14 provided oppositely to the strapping direction and through which the free end 9 of the rope can be moved so that the rope end extends in an S-formation. FIG. 9 correspondingly shows how the safety bore 14' alternatively can be provided in the strapping direction of the strapping slot 4, whereby the rope end 9 will be drawn in C-formation thereby increasing the securing safety of the rope.

Figure 10:
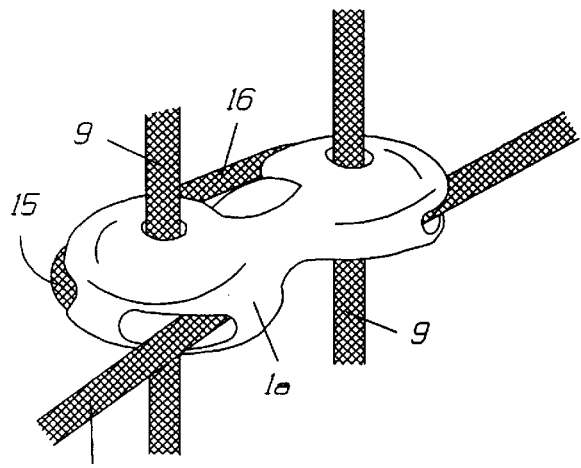
FIG. 10 is a perspective view of an alternative embodiment of a strapping apparatus according to the invention.
Figure 11:
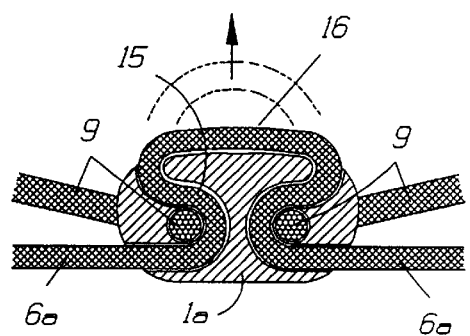
FIG. 11 is a horizontal cross sectional view of the apparatus of FIG. 10.

FIGS. 10 and 11 show a double acting strapping apparatus according to the invention in which the locking sling 6a, at both ends of the strapping body 1a, is S-shaped, and in which the two locking S-slings 15 are interconnected by an outer sling end 16 which can be seized by the hand of the operator, and which by being moved out from the strapping body 1a releases the rope ends 9 and thereby releases the entire strapping apparatus. In FIG. 11 is shown, with dotted lines, how the sling end 16 is pulled out from the strapping body 1a.

Figure 12:
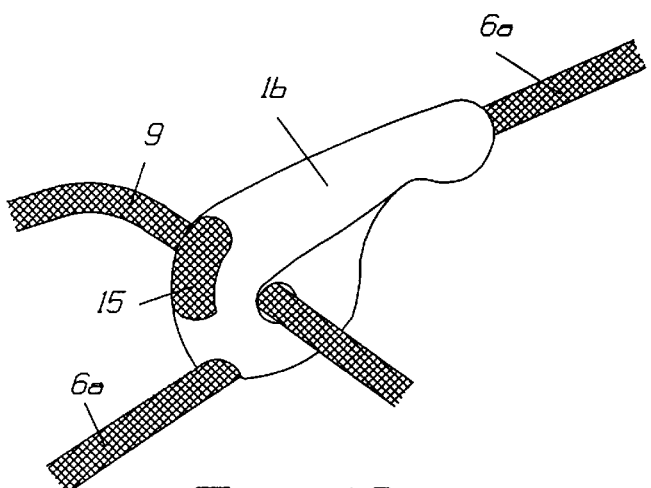
FIGS. 12 and 13 show, similarly to FIGS. 10 and 11, a still further embodiment of the invention.
Figure 13:
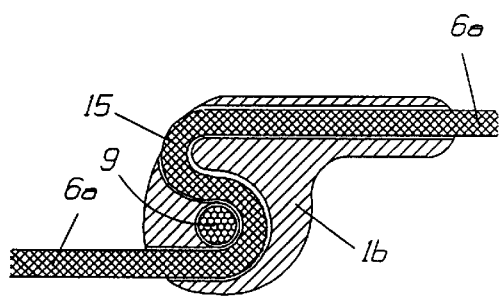

FIGS. 12 and 13 similarly show a single acting strapping apparatus by means of which one sling end 9 can be locked by the S-shaped sling 15 of the rope 6a extending through the strapping body 1b.

Figure 14:
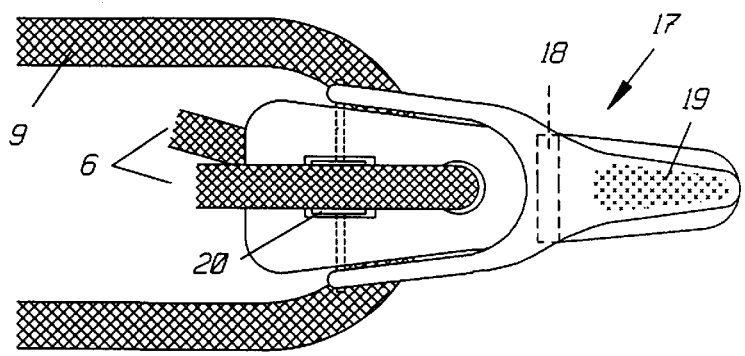
FIG. 14 is a top plan view of a strapping apparatus of the invention having means for facilitating the releasing of the rope in the apparatus.
Figure 15:
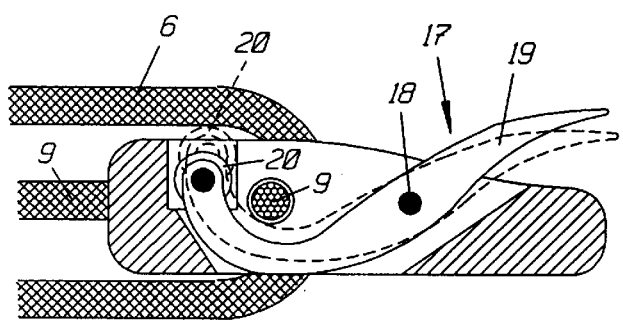
FIG. 15 is a vertical cross section through the apparatus of FIG. 14.

In some cases it may be hard to release the rope of the strapping apparatus since the strapping rope may have become very strongly strapped. To this end the strapping body can be formed with a rotatable releasing means, as shown in FIGS. 14 and 15 comprising a handle 17 which is rotatable in the strapping body over a pin 18. One end of the handle lever is formed with an actuation handle 19 and the opposite end of the handle is formed with a roller 20 which upon pressing the handle 19 lifts the sling 6 thereby facilitating the releasing the rope of the strapping lock.

Figure 16:
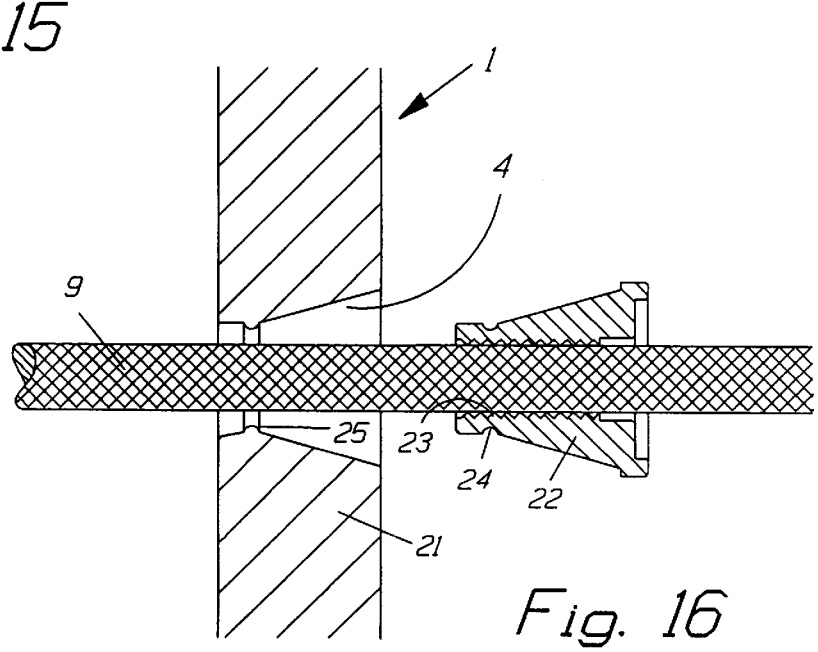
FIG. 16 is a vertical cross section view through the apparatus of FIG. 7 having means for securing the strapping rope in the strapping body.

FIG. 16 shows a safety locking device for the end of the rope 9 in an apparatus for instance of the type shown in FIG. 7. The bore 4 is formed tapering inwards to form a locking cone 21, in the illustrated case being a part of the strapping body 1, and the rope 9 has a wedge means 22 with an inner bore having a tooth shaped inner surface 23 which provides a safe locking of the rope when the wedge 33 is pressed into the locking cone 21. To prevent unintentional releasing of the two cone locking parts 21, 22 said two parts 21, 22 are formed with a co-operating groove 24 and rim 25 locking means. Said locking means 21–25 can be released by snatching the rope outwards, whereby the rope together with wedge is released and the strapping means as a whole is released.

| REFERENCE NUMERALS | |
|---|---|
| 1 | strapping body |
| 2 | strapping means (rope, wire) |
| 3 | slot, bore |
| 4 | slot, bore |
| 5 | slot, bore |
| 6 | eye, sling |
| 7 | clamp sleeve |
| 8 | bottom (of slot) |
| 9 | end of rope |
| 10 | bar |
| 11 | strapped object |
| 12 | pole |
| 13 | hook |
| 14 | safety securing bore |
| 15 | S-sling |
| 16 | outer sling end |
| 17 | handle |
| 18 | pin |
| 19 | actuation handle |
| 20 | roller |
| 21 | locking cone |
| 22 | wedge cone |
| 23 | tooth |
| 24 | groove |
| 25 | rim |

I claim:

1. A strapping apparatus for strapping, clamping together or holding together different objects, said apparatus comprising:

a strapping body comprising a solid body formed with two mirror symmetrical identical pairs of slots or bores extending angularly to each other and extending straight through the strapping body; and two strapping means, each of said strapping means comprising one of a rope, a wire and a band having a locking sling at one end thereof extending through one of the slots or bores of a respective one of said pairs of slots or bores, an opposite end of the strapping means being introduced through the second slot of said respective pair of slots or bores and drawn underneath the locking sling in a strapping direction.

2. The strapping apparatus according to claim 1, wherein a bottom of at least one of the slots or bores is convexly arc shaped as seen in the strapping direction.

3. The strapping apparatus according to claim 1 further comprising:

a cone-wedge locking means in the strapping body for locking said opposite end of the strapping means in the strapping body, said cone wedge locking means comprising a separate wedge body having a central bore having inner teeth through which the opposite end of the strapping means extends.

4. A strapping apparatus for strapping, clamping together or holding together different objects, said apparatus comprising:

a strapping body comprising a solid piece of material selected from the group consisting of plastic, wood and metal, said solid piece of material being formed with at least one pair of slots or bores extending angularly to each other and extending straight through the strapping body;

a strapping means comprising one of a rope, a wire and a band having a locking sling at one end thereof, said locking sling extending through one of the slots or bores of said pair of slots or bores, an opposite end of the strapping means being introduced through the other slot or bore of said pair of slots or bores and drawn underneath the eye in a strapping direction; and additional bores or slots in said strapping body for securing said strapping body to a stationary connection means.

5. A strapping apparatus for strapping, clamping together or holding together different objects, said apparatus comprising:

a strapping body comprising four metal arcs arranged at an angle of about 90° in relation to each other and joined at meeting ends thereof, said strapping body being formed with at least one pair of slots or bores extending angularly to each other and extending straight through the strapping body; and a strapping means comprising one of a rope, a wire and a band having a locking sling at one end thereof, said locking sling extending through one of the slots or bores of said pair of slots or bores, an opposite end of the strapping means being introduced through the other slot or bore of said pair of slots or bores and drawn underneath.

6. A strapping apparatus for strapping, clamping together or holding together different objects, said apparatus comprising:

a strapping body comprising a solid body formed with at least one pair of slots or bores extending angularly to each other and extending straight through the strapping body and an additional bore or slot extending straight through the strapping body; and a strapping means comprising one of a rope, a wire and a band having a locking sling at one end thereof, said locking sling extending through one of the slots or bores of said pair of slots or bores, an opposite end of the strapping means being introduced through the other slot or bore of said pair of slots or bores and drawn underneath the locking sling in a strapping direction, the opposite end of the strapping means being insertable through said additional bore or slot to form one of an S-shape and a C-shape for increasing safe locking of the strapping means.

7. A strapping apparatus for strapping, clamping together or holding together different objects, said apparatus comprising:

a strapping body comprising a solid body formed with at least one pair of slots or bores extending angularly to each other and extending straight through the strapping body; and a strapping means comprising one of a rope, a wire and a band having a locking sling at one end thereof, said locking sling extending in an S-shaped sling having two S-bows through one of the slots or bores of said pair of slots or bores, an opposite end of the strapping means being introduced through the second slot or bore of said pair of slots or bores and drawn underneath in one of the S-bows of said S-shaped sling.

8. A strapping apparatus for strapping, clamping together or holding together different objects, said apparatus comprising:

a strapping body comprising a solid body formed with at least one pair of slots or bores extending angularly to each other and extending straight through the strapping body;

a strapping means comprising one of a rope, a wire and a band having a locking sling at one end thereof, said locking sling extending through one of the slots or bores of said pair of slots or bores, an opposite end of the strapping means being introduced through the other slot or bore of said pair of slots or bores and drawn underneath the locking sling in a strapping direction; and a release handle formed in the strapping body, said release handle comprising a two-armed lever rotatable over a pin, one lever of said two-armed lever being an actuation handle and the other lever of said two-armed lever being formed with means for at least slightly lifting the locking sling to facilitate release of the strapping means from the strapping body.

\* \* \* \* \*